United States Patent
Namuduri et al.

(10) Patent No.: US 9,621,099 B1
(45) Date of Patent: Apr. 11, 2017

(54) METHOD FOR SWITCHING BETWEEN A FULL WINDING MODE AND A HALF WINDING MODE IN A THREE-PHASE MACHINE

(71) Applicant: GM GLOBAL TECHNOLOGY OPERATIONS LLC, Detroit, MI (US)

(72) Inventors: Chandra S. Namuduri, Troy, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/136,585

(22) Filed: Apr. 22, 2016

(51) Int. Cl.
 *H02P 25/18* (2006.01)
 *H02K 1/12* (2006.01)
 *H02K 21/14* (2006.01)

(52) U.S. Cl.
 CPC .............. *H02P 25/18* (2013.01); *H02K 1/12* (2013.01); *H02K 21/14* (2013.01)

(58) Field of Classification Search
 USPC ..... 318/400.09, 724, 748, 797, 400.14, 290, 318/400.02, 502, 400.41
 See application file for complete search history.

(56) References Cited

U.S. PATENT DOCUMENTS

| | | | | |
|---|---|---|---|---|
| 9,287,745 B2* | 3/2016 | Akatsu | ..................... | H02K 3/20 |
| 2002/0105301 A1* | 8/2002 | Bush | ...................... | H02P 25/18 |
| | | | | 318/771 |
| 2010/0123426 A1* | 5/2010 | Nashiki | .................... | H02K 1/12 |
| | | | | 318/701 |
| 2011/0057597 A1* | 3/2011 | Bosch | ..................... | H02P 25/18 |
| | | | | 318/497 |
| 2012/0056564 A1* | 3/2012 | Dietl | ...................... | H02P 25/18 |
| | | | | 318/17 |
| 2014/0239876 A1* | 8/2014 | Hao | ...................... | H02P 25/188 |
| | | | | 318/724 |

\* cited by examiner

*Primary Examiner* — Jorge L Carrasquillo
(74) *Attorney, Agent, or Firm* — John A. Miller; Miller IP Group, PLC

(57) ABSTRACT

A method for controlling switching between a full winding control mode and a half winding control mode for a multiphase electric machine. The machine includes a stator and a rotor, split stator windings for each phase of the machine, where each stator winding includes a first winding section and a second winding section, an inverter circuit including a pair of inverter switches for each phase of the machine, where the pair of inverter switches for each phase is electrically coupled to the first and second winding sections for that phase, and a plurality of switch assemblies for switching between the full winding mode and the half winding mode, where each switch assembly is electrically coupled to the pair of inverter switches and the first and second winding sections for a particular phase, and where each switch assembly includes a first AC switching device and a second AC switching device.

17 Claims, 5 Drawing Sheets

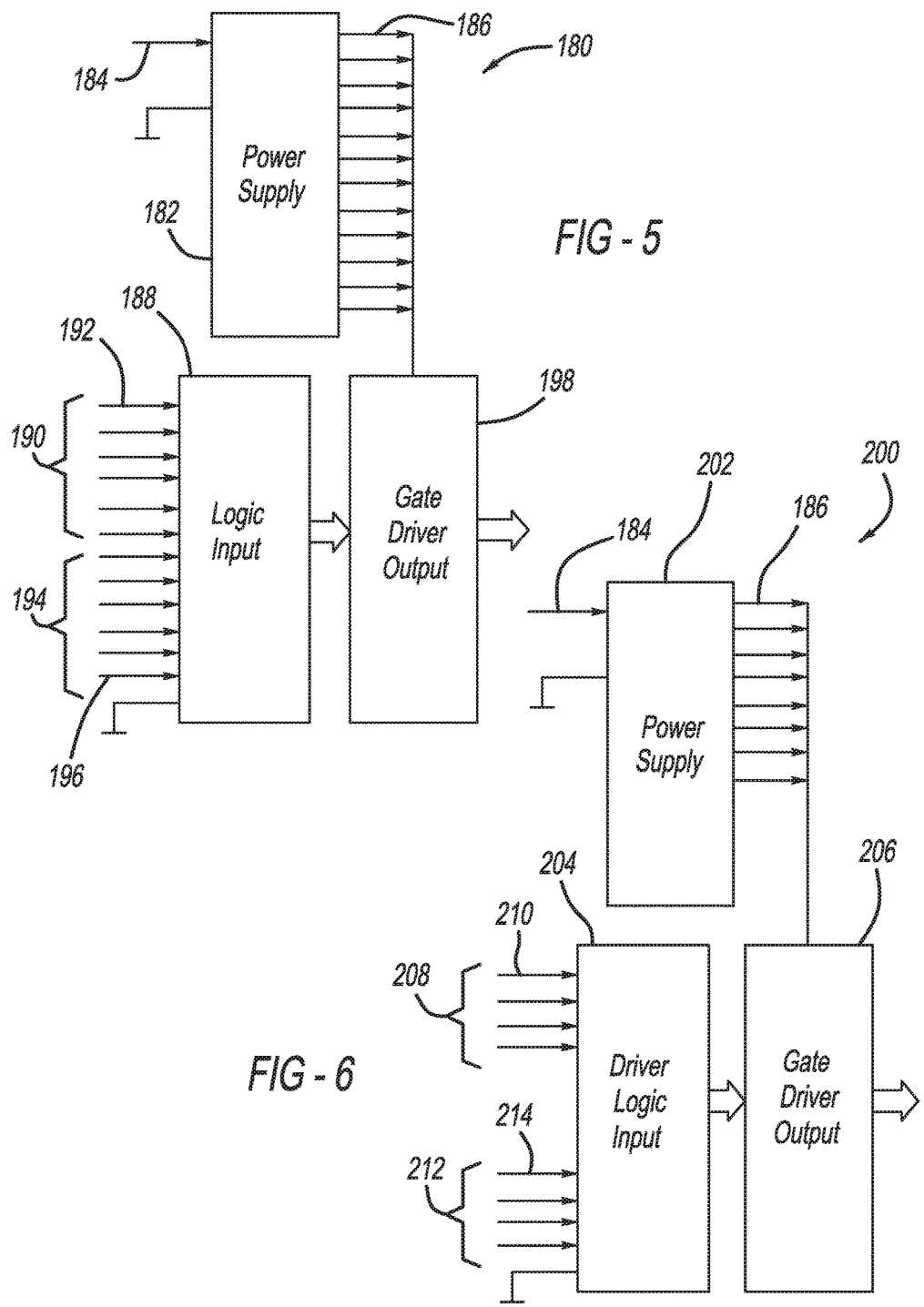

METHOD FOR SWITCHING BETWEEN A FULL WINDING MODE AND A HALF WINDING MODE IN A THREE-PHASE MACHINE

BACKGROUND OF THE INVENTION

Field of the Invention

This invention relates generally to a method for switching between a full winding control mode and a half winding control mode for a three-phase machine and, more particularly, to a method for switching between a full winding control mode and a half winding control mode for a three-phase permanent magnet (PM) AC electric machine including split stator windings so as to reduce back EMF and increase the torque and power of the machine at higher machine speeds.

Discussion of the Related Art

An electric machine having a wide speed range is essential for automotive propulsion systems, such as for hybrid vehicles, electric vehicles, fuel cell vehicles, etc., and for power generation applications. In order to maximize its torque/ampere ratio, an electric machine is typically designed to have as high of an induced voltage-to-speed ratio as possible. However, because the induced voltage is proportional, especially as the speed of the machine increases, the back electro-motive force (EMF) generated by the machine also increases as the machine speed increases until it reaches the DC bus voltage, generally a battery voltage, which results in a loss of EMF available to drive the current in the motor, which acts to limit the speed of the machine.

It is known in the art to separate the stator windings for each phase of an electric machine into two split windings to reduce machine back EMF at high machine speed. Switches are provided and are controlled so that the split windings for each phase are electrically coupled in series for low machine speeds and are electrically coupled in parallel when the speed of the machine reaches the point where the back EMF reduces the machine torque. However, by providing twice as many windings in the stator and the switches necessary to switch between an electrical series configuration and a parallel configuration, this solution for winding reconfiguration increases the number of required AC switches to nine and the total number of machine leads to ten for a three-phase machine. Further, there is the potential for circulating currents in the parallel configuration due to coil EMF mismatches. Also, coils are required to be in the same stator slot for parallel operation, and lower coil inductance in the parallel operation may need higher switching frequencies to reduce current ripple.

U.S. Patent Application Publication No. 2014/0239876 to Hao et al., published Aug. 28, 2014, assigned to the assignee of this application, discloses an electric drive system for a three-phase PM electric machine, where each phase of the machine includes a stator winding separated into a first winding section and a second winding section and two switches in an inverter electrically coupled to the winding sections. The drive system includes a switch assembly for each phase electrically coupled to the inverter switches and the first and second winding sections, where the switch assembly includes at least two switch states. A first switch state of the switch assembly electrically couples the first winding section and the second winding section in series to the inverter switches and a second switch state electrically coupled to the second winding section to the inverter switches and electrically disconnects the first winding section from the inverter switches.

SUMMARY OF THE INVENTION

The present invention discloses and describes a method for controlling switching between a full winding control mode and a half winding control mode for a symmetrical winding configuration of a multi-phase electric machine. The machine includes a stator and a rotor, split stator windings for each phase of the machine, where each stator winding includes a first winding section and a second winding section, an inverter circuit including a pair of inverter switches for each phase of the machine, where the pair of inverter switches for each phase is electrically coupled to the first and second winding sections for that phase in the stator, and a plurality of switch assemblies for switching between the full winding mode and the half winding mode, where each switch assembly is electrically coupled to the pair of inverter switches and the first and second winding sections for a particular phase, and where each switch assembly includes a first AC switching device and a second AC switching device. The method includes identifying motor speed and torque command signals for the machine and determining whether the motor speed and torque command signals require the full winding mode or the half winding mode. The method also includes determining whether the winding control mode of the machine is transitioning from the half winding mode to the full winding mode if the motor speed and torque command signals require the full winding mode, and determining whether the winding control mode is transitioning from the full winding mode to the half winding mode if the motor speed and torque command signals require the half winding mode. The method provides switching control commands for the plurality of switch assemblies for a direct-axis current, a quadrature-axis current and current loop gains for full stator windings if the motor speed and torque command signals require the full winding mode and the winding mode is not transitioning from the half winding mode to the full winding mode or provides switching control commands for the plurality of switch assemblies for the direct-axis current, the quadrature-axis current and the current loop gains for half stator windings if the motor speed and torque command signals require the half winding mode and the winding mode is not transitioning from the full winding mode to the half winding mode. The method sets the direct-axis current and the quadrature-axis current to zero if the motor speed and torque command signals require the full winding mode or the half winding mode and it is determined that the winding control mode is transitioning from the half winding mode to the full winding mode or is transitioning from the full winding mode to the half winding mode. The method waits for a phase current in each of the stator windings to be less than a predetermined minimum current after the direct-axis current and the quadrature-axis current have been set to zero and disables inverter circuit switch signals and half winding mode switch signals provided to the AC switch devices for the full winding mode or disables the inverter circuit switch signals and full winding mode switch signals provided to the AC switch devices for the half winding mode after the direct-axis current and the quadrature-axis current are set to zero. The method waits for a predetermined time delay after the inverter circuit switch signals and the half winding mode switch signals or the full winding mode switch signals are disabled. The method sets the direct-axis current, the quadrature-axis current and the current loop gains to predetermined values for the full winding mode or the half winding mode after the time delay has expired, enables the inverter circuit switch signals and the full winding mode switch signals provided to the AC switch devices for the full winding mode or enables the inverter switch signals and the half winding mode switch signals provided to the AC switch devices for the half winding mode, and provides the switching control commands for the plurality of switch assemblies for the direct-axis current, the quadrature-axis current and the current loop gains for the full stator windings or for the half stator windings.

Additional features of the present invention will become apparent from the following description and appended claims, taken in conjunction with the accompanying drawings.

BRIEF DESCRIPTION OF THE DRAWINGS

FIG. 5 is a schematic block diagram of an SCR drive system for the power switches shown in FIG. 2;

FIG. 6 is a schematic block diagram of an SCR drive system for the power switches shown in FIG. 3;

DETAILED DESCRIPTION OF THE EMBODIMENTS

The following discussion of the embodiments of the invention directed to a method for switching between a full winding control mode and a half winding control mode in a three-phase PM electric machine is merely exemplary in nature, and is in no way intended to limit the invention or its applications or uses. For example, the method of the invention has particular application for a three-phase PM electric machine on a vehicle. However, as will be appreciated by those skilled in the art, the method of the invention will have application for other machines.

Figure 1:
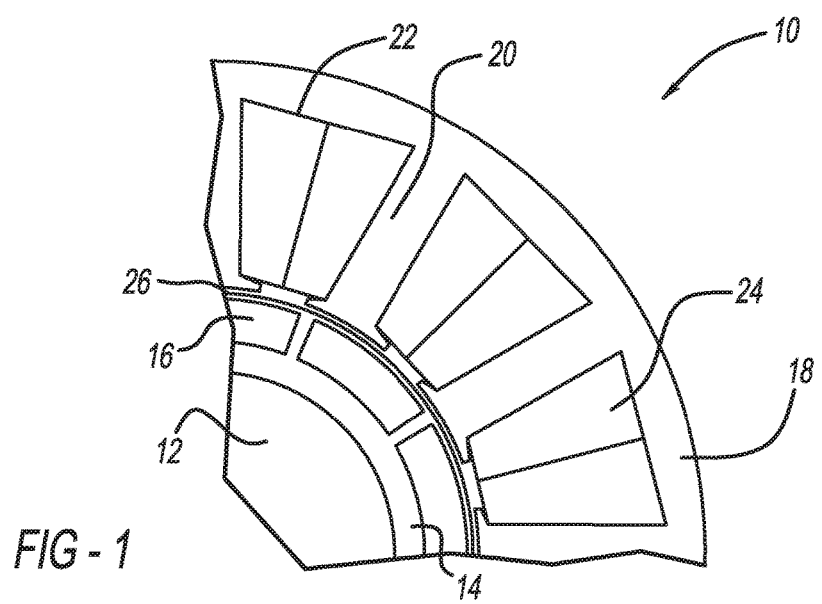
FIG. 1 is a broken-away end view of a PM electric machine including a stator and a rotor.

FIG. 1 is a broken-away end view of a conventional PM three-phase electric machine 10. The electric machine 10 includes a center shaft 12 surrounded by and mounted to a cylindrical rotor 14. The rotor 14 includes a plurality of permanent magnets 16 disposed around an outer perimeter of the rotor 14. The machine 10 also includes a cylindrical stator 18, having stator teeth 20 defining slots 22 therebetween, where stator windings 24 are wound around the teeth 20 through the slots 22. An air gap 26 separates the rotor 14 from the stator 18 and allows it to rotate relative thereto.

As is well understood by those skilled in the art, an alternating current at the proper phase is provided to the stator windings 24 so that the magnetic field generated by the current flowing through the windings 24 interacts with the magnetic field generated by the permanent magnets 16 in a manner that causes the rotor 14 to rotate relative to the stator 18, and thus causes the shaft 12 to rotate performing physical work. A flux path around the windings 24 passes through the rotor 14, the permanent magnet 16, the air gap 26 and the stator 18 to form a closed loop path and link the stator windings 24. The induced voltage of the stator 18 is proportional to the total flux linking the stator windings 24. The interaction of the magnetic flux between the permanent magnet 16 with the current flow in the windings 24 produces the torque that drives the machine 10.

Figure 2:
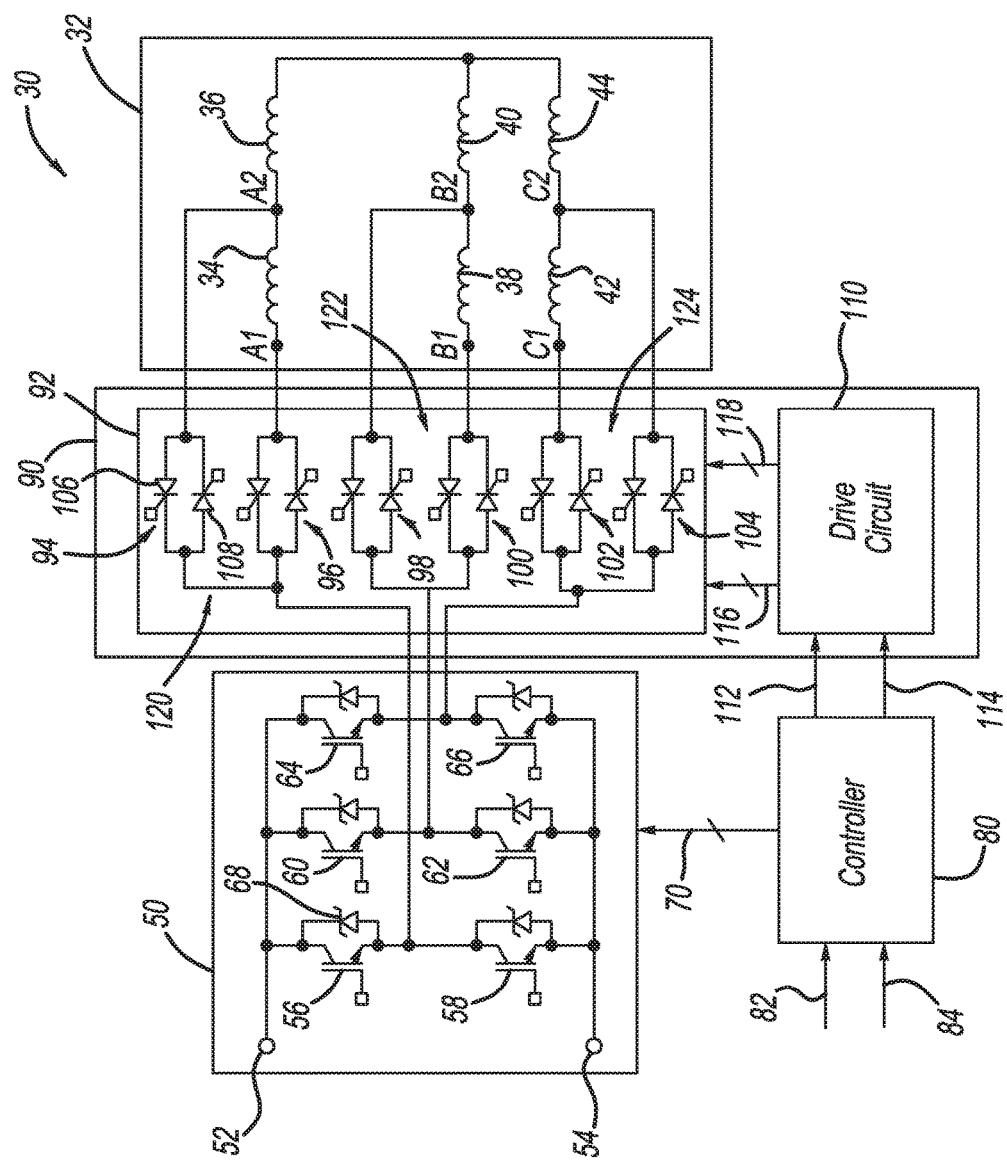
FIG. 2 is a schematic block diagram of a six-lead, six AC switch drive system for a PM electric machine employing anti-parallel SCR AC power switches.

FIG. 2 is a schematic block diagram of a drive system 30 for a three-phase PM electric machine, such as the machine 10, where windings are shown for a stator 32 of the machine. The windings include split stator windings having winding sections 34 and 36 for the first machine phase, winding sections 38 and 40 for the second machine phase, and winding sections 42 and 44 for the third machine phase.

The drive system 30 includes an inverter/rectifier circuit 50 having a plurality of MOSFET or IGBT switches that are selectively switched on and off to provide AC and DC inversion and rectification between a vehicle battery (not shown) coupled to nodes 52 and 54 and the winding sections 34-44 in the stator 32. Particularly, the circuit 50 includes switches 56 and 58 for controlling the first phase winding sections 34 and 36, switches 60 and 62 for controlling the second phase winding sections 38 and 40, and switches 64 and 66 for controlling the third phase winding sections 42 and 44. The circuit 50 converts the DC current from the battery to an AC current when the machine is operating as a motor to, for example, start the vehicle. The circuit 50 also includes a plurality of diodes 68 that rectify the AC current generated by the winding sections 34-44 to a DC current to charge the battery. The switches 56-66 are switched by a controller 80 on six lines 70, where the controller 80 receives a torque command signal on line 82 and a machine speed signal on line 84 to provide the desired AC/DC inversion or DC/AC conversion in a manner well understood by those skilled in the art.

The drive system 30 also includes a silicon controlled rectifier (SCR) switching system 90 that switches the current signals from the inverter circuit 50 so that all of the winding sections 34-44 are electrically coupled to the inverter 50 at low machine speeds and only the winding sections 36, 40 and 44 are electrically coupled to the circuit 50 at high machine speeds. As discussed above, by reducing the number of stator windings at high machine speeds, the back EFM of the machine is reduced by reducing the magnetic flux when the back EFM is significant enough to reduce machine speed by limiting current flow through the stator windings in a similar manner as disclosed in the '876 application referenced above.

To provide this winding reconfiguration operation, the switching system 90 includes a switch circuit 92 having a first switch assembly 120 for switching the first phase winding sections 34 and 36, a second switch assembly 122 for switching the second phase winding sections 38 and 40, and a third switch assembly 124 for switching the third phase winding sections 42 and 44. The first switch assembly 120 includes AC switch devices 94 and 96 coupled to nodes A2 and A1, respectively, for switching the first phase winding sections 34 and 36 between the full winding mode and the half winding mode. The second switch assembly 122 includes AC switch devices 98 and 100 coupled to nodes B2 and B1, respectively, for switching the second phase winding sections 38 and 40 between the full winding mode and the half winding mode. The third switch assembly 124 includes AC switch devices 102 and 104 coupled to nodes C1 and C2, respectively, for switching the third phase winding sections 42 and 44 between the full winding mode and the half winding mode. Each of the switch devices 94, 96, 98, 100, 102 and 104 include a pair of opposing thyristor switches 106 and 108 that provide a low switch on voltage, for example, 1-1.5 volts, are very rugged, provide high overload capability, and have less than a 10 ms switching time.

The switch devices 94, 96, 98, 100, 102 and 104 are controlled by an SCR drive circuit 110 that receives commands from the controller 80 to switch between the full winding mode provided by a command on line 112 and the half winding mode provided by a command on line 114. Six control lines 116 are coupled to the switch circuit 92 to switch the switch devices 96, 100 and 102 to the full winding mode and six control lines 118 are coupled to the switch circuit 92 to switch the switch devices 94, 98 and 104 to the half winding mode. A more detailed discussion of how the SCR drive circuit 110 controls the switch devices 94-104 to provide the full winding mode and the half winding mode is provided below.

The winding switch topology shown in the SCR drive system 90 requires six leads coupled between the switch devices 94, 96, 98, 100, 102 and 104 and the nodes A1, A2, B1, B2, C1 and C2. Alternate embodiments may be employed within the scope of the present invention that provide the same type of AC switching between the full winding mode and the half winding mode, but require fewer switches and/or fewer leads.

Figure 3:
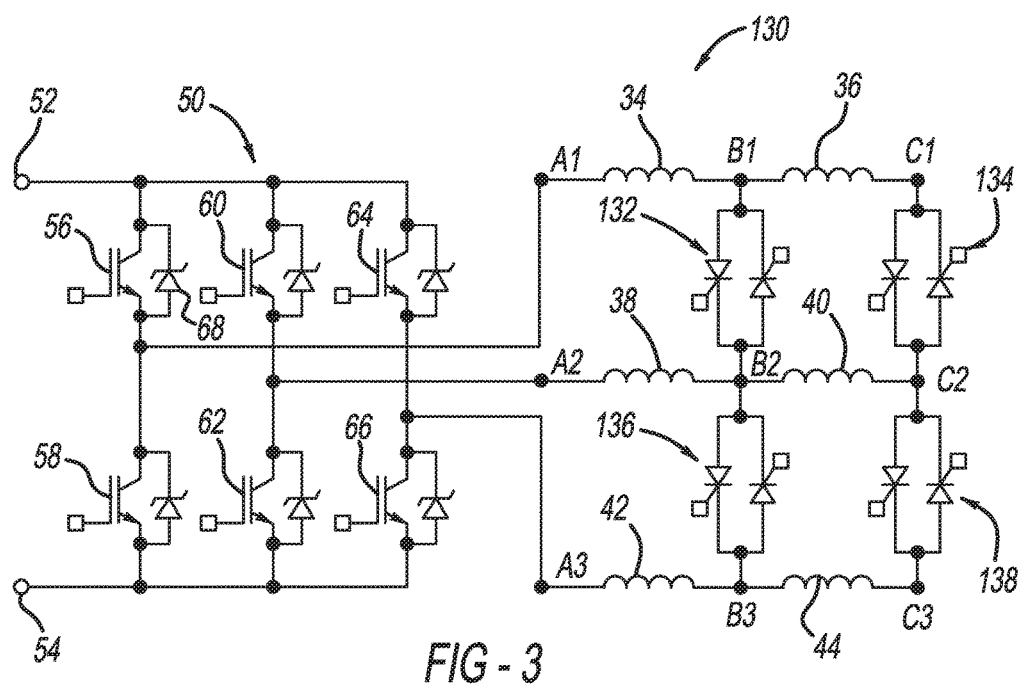
FIG. 3 is a schematic block diagram of a nine-lead, four AC switch drive system for a PM electric machine employing anti-parallel SCR AC power switching devices.

FIG. 3 is a schematic diagram of a drive system 130 including a winding switch topology architecture that employs nine leads and four AC switch devices, where like elements to the drive system 30 have the same reference number. The controller 80 and the switching system 90 have been removed from FIG. 3 for clarity purposes. In this embodiment, the six AC switch devices 94, 96, 98, 100, 102 and 104 have been replaced with four AC switch devices, namely, an AC switch device 132 electrically coupled between nodes B1 and B2, an AC switch device 134 electrically coupled between nodes C1 and C2, an AC switch device 136 electrically coupled between nodes B2 and B3, and an AC switch device 138 electrically coupled between nodes C2 and C3, as shown. In this embodiment, the number of the control lines 116 and 118 is four each. For the full winding mode, the AC switch devices 134 and 138 are kept on and the AC switch devices 132 and 136 are kept off. This essentially creates a neutral point connecting the nodes C1, C2 and C3 together, where the winding sections 34 and 36 through the nodes A1, B1 and C1, the winding sections 38 and 40 through the nodes A2, B2 and C2, and the winding sections 42 and 44 through the nodes A3, B3 and C3 carry the current produced by the circuit 50. For the half winding mode, the AC switch devices 132 and 136 are kept on and the AC switch devices 134 and 138 are kept off. This essentially creates a neutral point connecting the nodes B1, B2 and B3 together, where only the winding section 34 through the nodes A1 and B1, the winding section 38 through the nodes A2 and B2, and the winding section 42 through the nodes A3 and B3 carry the current produced by the circuit 50, and where the winding section 36 through the nodes B1 and C1, the winding section 40 through the nodes B2 and C2, and the winding section 44 through the nodes B3 and C3 are open circuited and do not carry any current because the switch devices 134 and 138 are off. More discussion of how the SCR drive circuit 110 controls the switch devices 132-138 to provide the full winding mode and the half winding mode is provided below.

Figure 4:
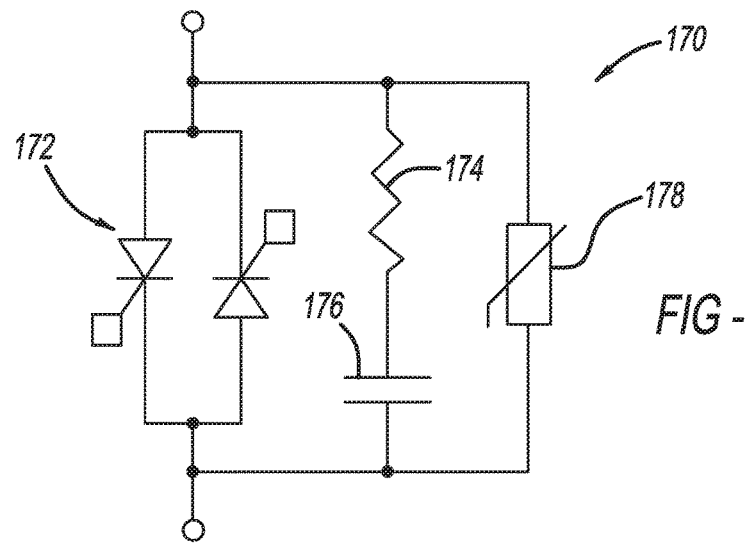
FIG. 4 is a schematic diagram of an SCR RC snubber circuit.

For the embodiments discussed above that employ the SCR drive system, circuit elements may be required to limit the change in voltage dV/dt and the maximum voltage $V_{max}$ of the AC switches. FIG. 4 is a schematic diagram of an SCR snubber circuit 170 including an AC switch device 172 of the type discussed above and circuit elements for limiting the change in voltage dV/dt and the maximum voltage $V_{max}$. The snubber circuit 170 could be included as part of each of the AC switch devices in the SCR drive circuit in the system 30 or 130. The snubber circuit 170 includes a resistor 174 and a capacitor 176 that define an RC circuit that limits the change in voltage dV/dt to be less than 1 kV/μs, for example. For this embodiment, the resistor 174 is a low inductance resistor, such as Ls<0.4 μH, and the capacitor 176 is a high pulse rated snubber capacitor that causes the change in voltage dV/dt to be greater than 2 kV/μs. The voltage change rate dV/dt can be defined by an equivalent circuit as:

$$\left(\frac{dV_d}{dt}\right)_0 = R\left[\frac{V}{L} + \frac{I_{RM}}{\tau}\right], \quad (1)$$

where R is the resistance of the resistor 174, V is the voltage across the switch 172, L is the inductance of the resistor 174, $I_{RM}$ is the current flow through the resistor 174 and the capacitor 176, and r is the time constant of decay of the SCR reverse recovery current from its peak value of $I_{RM}$.

The snubber circuit 170 also includes a metal-oxide varistor (MOV) 178 that provides a voltage clamp to limit the maximum voltage $V_{max}$ and, in one embodiment, limits the SCR voltage to be below 1.2 kV. Additionally, the AC switch devices can be mounted to a liquid cooled cold plate to maintain the temperature below 0.01° C./W.

FIG. 5 is a block diagram of an SCR drive system 180 that can be used as the drive circuit 110 for the AC switch configuration shown in FIG. 2. The system 180 includes an isolated twelve output power supply 182 that receives 12 VDC on line 184 and provides in this example, 3.3 volts at 1 watt per power for each output line 186. The drive system 180 also includes an isolated driver with logic input block 188 that receives twelve inputs, where each input turns on one of the thyristor switches 106 and 108 in the switch devices 94-104. Particularly, the block 188 receives a group 190 of inputs 192 that control the half winding mode, where each one of the inputs 192 turns on a particular one of the thyristor switches 106 and 108 in each of the switch devices 94, 98 and 104, and a group 194 of inputs 196 that control the full winding mode, where each one of the inputs 196 turns on one of the thyristor switches 106 and 108 in each of the switches 96, 100 and 102. The signals from the logic input block 188 are then transferred to a gate driver output block 198 having twelve outputs that control the AC switch devices 94, 96, 98, 100, 102 and 104 to switch between the full winding mode and the half winding mode as discussed.

A similar type of SCR driver system can be provided for the winding topology shown in FIG. 3 that includes the four AC switch devices 132-138. FIG. 6 is a schematic block diagram of a drive system 200 showing this design, where like elements to the drive system 180 are identified by the same reference number. In this embodiment, the power supply 182 is replaced with an isolated eight output power supply 202, the isolated driver with logic input block 188 is replaced with an isolated driver with logic input block 204, and the gate driver output block 198 is replaced with a gate driver output block 206 having eight outputs. A group 208 of inputs 210 control the half winding mode, where each of the inputs 210 switches on one of the thyristor switches 106 or 108 in the switch devices 132 and 136, and a group 212 of inputs 214 control the full winding mode, where each one of the inputs 214 switches on one of the thyristor switches 106 or 108 in the switch devices 134 and 138.

Figure 7:
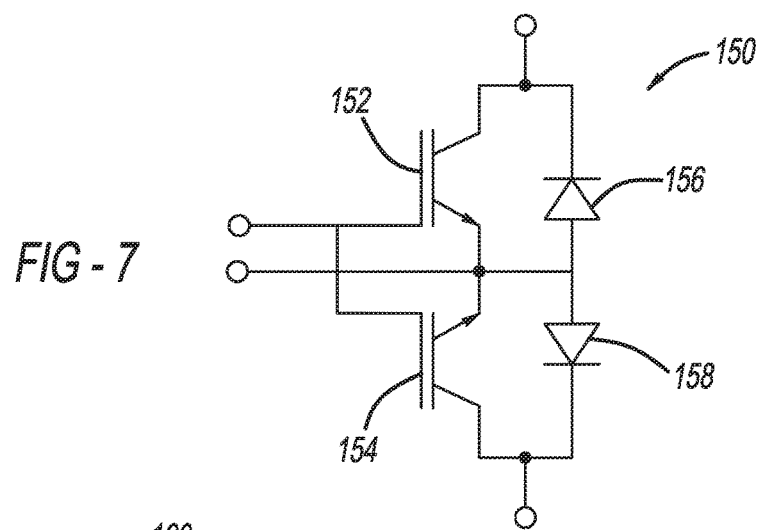
FIG. 7 is a schematic diagram of an anti-series IGBT AC power switching device that can be used in the drive systems shown in FIGS. 2 and 3.

In the embodiments discussed above, the switch devices 94, 96, 98, 100, 102, 104, 132, 134, 136 and 138 employ SCR switches. In alternate embodiments, the thyristor switches 106 and 108 can be replaced with insulated gate bipolar transistor (IGBT) switches. For example, FIG. 7 is a schematic diagram of an AC switch circuit 150 including two anti-series IGBT switches 152 and 154 and two opposing diodes 156 and 158 electrically coupled as shown that can be used instead of the AC switch devices 94, 96, 98, 100, 102, 104, 132, 134, 136 and 138.

Figure 8:
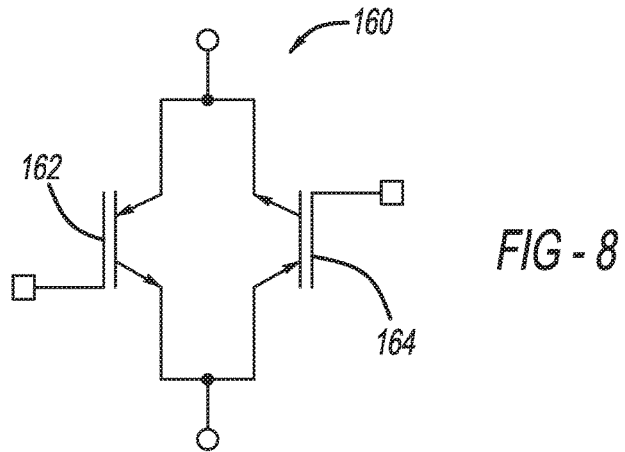
FIG. 8 is a schematic diagram of an anti-parallel RB-IGBT AC power switching device that can be used in the drive systems shown in FIGS. 2 and 3.

Alternately, FIG. 8 is a schematic diagram of an AC switch circuit 160 including two anti-parallel reverse blocking (RB)-IBGT switches 162 and 164 electrically coupled as shown that can be used instead of the AC switch devices 94, 96, 98, 100, 102, 104, 132, 134, 136 and 138.

Figure 9:
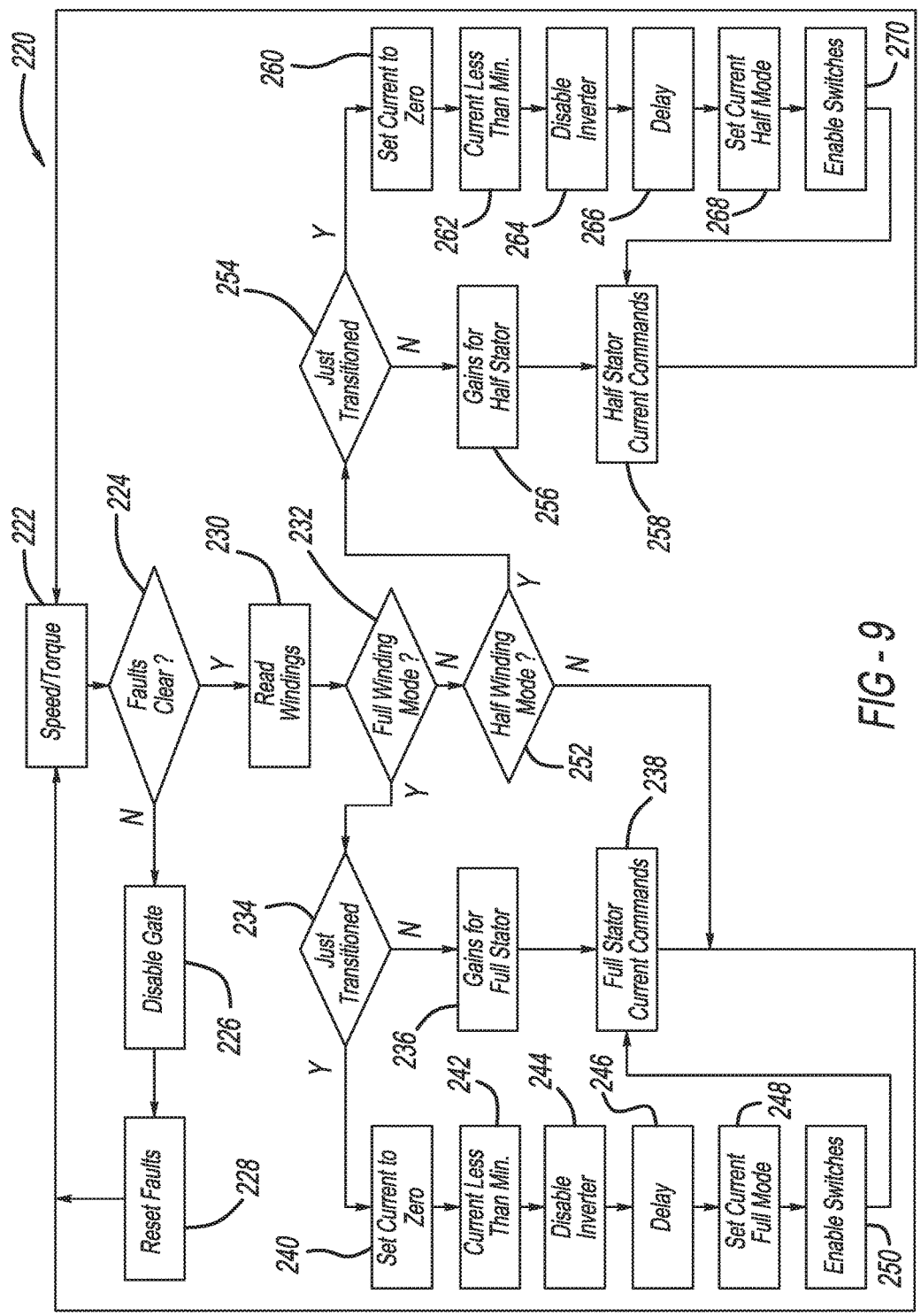
FIG. 9 is a flow chart diagram showing a control scheme for switching between a full winding mode and a half winding mode for a symmetrical winding reconfiguration of a three-phase PM machine using the SCR drive systems.

FIG. 9 is a flow chart diagram 220 showing a control scheme for switching between a full winding control mode and a half winding control mode for a symmetrical winding reconfiguration of a three-phase PM machine using the SCR drive systems discussed above. At box 222, the algorithm reads the motor speed and torque command signals that are provided to the controller 80 on the lines 82 and 84, respectively, and identifies any diagnostic trouble codes that may affect machine performance and operation. The algorithm then determines whether all of the possible faults for the inverter circuit 50 are clear at decision diamond 224, and if not, disables the gate signals sent to the inverter switches 56-66 at box 226 and waits for the faults to be reset at box 228.

If all of the inverter circuit faults are clear at the decision diamond 224, then the algorithm reads a winding configuration bit at box 230 to determine whether the motor speed and torque command signals require the full stator winding mode or the half stator winding mode, where the winding configuration bit can be set by reading an external digital half winding input/output line or be determined based on the speed and torque error of the machine. Once the winding configuration bit is read at the box 230, the algorithm determines whether the winding configuration bit is set to the full winding mode at decision diamond 232, and if so, provides a switch control scheme for the full winding mode. Particularly, the algorithm first determines whether the winding configuration has just transitioned from the half winding mode to the full winding mode at decision diamond 234, meaning that the winding control mode was in the half winding mode at the previous sample time. If the winding configuration is not transitioning from the half winding mode to the full winding mode at the decision diamond 234, then the algorithm uses switching controls for a proper direct-axis current $I_d$, a quadrature-axis current $I_q$, and current loop gains $K_{ip}$ and $K_{ii}$ for full stator windings at box 236, where the current loop gains $K_{ip}$ and $K_{ii}$ are set for direct-axis and quadrature-axis current control and the currents $I_d$ and $I_q$ are provided from look-up tables. It is understood in the art that the gains $K_{ip}$ and $K_{ii}$ in direct-axis and quadrature-axis current control are different. The direct-axis current $I_d$, the quadrature-axis current $I_q$, and the current loop gains $K_{ip}$ and $K_{ii}$ are well known variables for PID control. The output commands for the currents $I_d$ and $I_q$ for the full winding mode based on the speed and torque commands are then provided at box 238, and the algorithm returns to the box 222 to read motor speed and torque command signals.

If the winding configuration is transitioning from the half winding mode to the full winding mode at the decision diamond 234, the algorithm first sets the direct-axis current $I_d$ and the quadrature-axis current $I_q$ to zero at box 240, and then waits for the phase current in each of the stator windings to be less than a predetermined minimum current $\epsilon$ at box 242. The algorithm also disables the inverter circuit switch signals and the half winding switch signals provided to the gate terminals of the thyristor switches in the AC switch devices at box 244. The algorithm then waits for some predetermined time delay $T_{delay}$ that is typically a calibration number from 1 msec to 10 msec at box 246, and then sets the direct-axis current $I_d$, the quadrature-axis current $I_q$, and the current loop gains $K_{ip}$ and $K_{ii}$ for the full winding mode at box 248. The algorithm then enables the inverter switch signals and the full winding mode switch signals provided to the gate terminals of the thyristor switches in the AC switch devices at box 250, and outputs the direct-axis current command and the quadrature-axis current command at the box 238 for the full winding mode.

If the winding configuration bit is not set for the full winding mode at the decision diamond 232, then the algorithm determines whether the winding configuration bit is set for the half winding mode at decision diamond 252, and if not, returns to the box 222 to wait to read the motor speed and torque command.

If the winding configuration bit is set to the half winding mode at decision diamond 252, the algorithm provides a switch control scheme for the half winding mode. Particularly, the algorithm first determines whether the winding configuration has just transitioned from the full winding mode to the half winding mode at decision diamond 254, meaning that the winding control mode was in the full winding mode at the previous sample time. If the winding mode is not transitioning from the full winding mode to the half winding mode at the decision diamond 254, then the algorithm uses switching controls for the direct-axis current $I_d$, the quadrature-axis current $I_q$, and the current loop gains $K_{ip}$ and $K_{ii}$ for half stator windings at box 256, where the current loop gains $K_{ip}$ and $K_{ii}$ are set for direct-axis and quadrature-axis current control of partial stator windings and the currents $I_d$ and $I_q$ are provided from look-up tables. It is understood that $K_{ip}$ and $K_{ii}$ herein in direct-axis and quadrature-axis current control of partial stator winding are different, but it is also different for the gain in d-axis or q-axis current control of full stator winding. The output commands for the currents $I_d$ and $I_q$ for the half winding mode based on the speed and torque commands are then provided at box 258, and the algorithm returns to the box 222 to read motor speed and torque command signals.

If the winding configuration is transitioning from the full winding mode to the half winding mode at the decision diamond 254, the algorithm first sets the direct-axis current current $I_d$ and the quadrature-axis current $I_q$ to zero at box 260, and then waits for the phase current in each of the stator windings to be less than the predetermined minimum current $\epsilon$ at box 262. The algorithm also disables the inverter circuit switch signals and the full winding switch signals provided to the gate terminals of the thyristor switches in the AC switch devices at box 264. The algorithm then waits for the predetermined time delay $T_{delay}$ at box 266, and then sets the direct-axis current $I_d$, the quadrature-axis current $I_q$, and the current loop gains $K_{ip}$ and $K_{ii}$ for the half winding mode at box 268. The algorithm then enables the inverter switch signals and the half winding mode switch signals provided to the gate terminals of the thyristor switches in the AC switch devices at box 270, and outputs the direct-axis current command and the quadrature-axis current command at the box 258 for the half winding mode.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling switching between a full winding control mode and a half winding control mode for a symmetrical winding configuration of a multi-phase electric machine, said machine including a stator and a rotor, split stator windings for each phase of the machine, where each stator winding includes a first winding section and a second winding section, an inverter circuit including a pair of inverter switches for each phase of the machine, where the pair of inverter switches for each phase is electrically coupled to the first and second winding sections for that phase in the stator, and a plurality of switch assemblies for switching between the full winding mode and the half winding mode, where each switch assembly is electrically coupled to the pair of inverter switches and the first and second winding sections for a particular phase, and where each switch assembly includes a first AC switching device and a second AC switching device, said method comprising:
   identifying motor speed and torque command signals for the machine;
   determining whether the motor speed and torque command signals require the full winding mode or the half winding mode;
   determining whether the winding control mode of the machine is transitioned from the half winding mode to the full winding mode if the motor speed and torque command signals require the full winding mode, and determining whether the winding control mode is transitioning from the full winding mode to the half winding mode if the motor speed and torque command signals require the half winding mode;
   providing switching control commands for the plurality of switch assemblies for a direct-axis current, a quadrature-axis current and current loop gains for full stator windings if the motor speed and torque command signals require the full winding mode and the winding mode is not transitioning from the half winding mode to the full winding mode or providing switching control commands for the plurality of switch assemblies for the direct-axis current, the quadrature-axis current and the current loop gains for half stator windings if the motor speed and torque command signals require the half winding mode and the winding mode is not transitioning from the full winding mode to the half winding mode;
   setting the direct-axis current and the quadrature-axis current to zero if the motor speed and torque command signals require the full winding mode or the half winding mode and it is determined that the winding mode is transitioning from the half winding mode to the full winding mode or is transitioning from the full winding mode to the half winding mode;
   waiting for a phase current in each of the stator windings to be less than a predetermined minimum current after the direct-axis current and the quadrature-axis current have been set to zero;
   disabling inverter circuit switch signals and half winding mode switch signals provided to the AC switch devices for the full winding mode or disabling the inverter circuit switch signals and full winding mode switch signals provided to the AC switch devices for the half winding mode after the direct-axis current and the quadrature-axis current are set to zero;
   waiting for a predetermined time delay after the inverter circuit switch signals and the half winding mode switch signals or the full winding mode switch signals are disabled;
   setting the direct-axis current, the quadrature-axis current and the current loop gains to predetermined values for the full winding mode or the half winding mode after the time delay has expired;
   enabling the inverter circuit switch signals and the full winding mode switch signals provided to the AC switch devices for the full winding mode or enabling the inverter switch signals and the half winding mode switch signals provided to the AC switch devices for the half winding mode; and
   providing the switching control commands for the plurality of switch assemblies for the direct-axis current, the quadrature-axis current and the current loop gains for the full stator windings or the half stator windings.

2. The method according to claim 1 further comprising identifying diagnostic trouble codes or faults that may affect machine performance and operation before determining whether the motor speed and torque command signals require the full winding mode or the half winding mode, and disabling switch signals provided to the inverter switches if a trouble code or fault is detected.

3. The method according to claim 1 wherein waiting for a predetermined time delay includes waiting for a time between 1 and 10 msec.

4. The method according to claim 1 wherein the electric machine is a three-phase permanent magnet (PM) AC machine.

5. The method according to claim 4 wherein the plurality of switch assemblies is three switch assemblies, and wherein the first AC switching device is electrically coupled to the inverter switches and to both the first and second winding sections to provide the full winding control mode and the second AC switching device is electrically coupled to the inverter switches and to only the first winding section to provide the half winding control mode for each phase.

6. The method according to claim 4 wherein the plurality of switch assemblies is two switch assemblies where a first switch assembly includes a first AC switching device electrically coupled between the first and second winding sections of a first winding and first and second winding sections of a second winding and a second AC switching device electrically coupled to the first winding section of the first winding and the first winding section of the second winding, and a second switch assembly includes a first AC switching device electrically coupled between the first and second winding sections of the second winding and the first and second winding sections of a third winding and a second AC switching device electrically coupled to the first winding section of the second winding and the first winding section of the third winding.

7. The method according to claim 1 wherein the electric machine is on a vehicle.

8. A method for controlling switching between a full winding control mode and a half winding control mode for a symmetrical winding configuration of a multi-phase electric machine, said method comprising:
   identifying motor speed and torque command signals for the machine;
   determining whether the motor speed and torque command signals require the full winding mode or the half winding mode;
   determining whether the winding control mode of the machine is transitioned from the half winding mode to the full winding mode if the motor speed and torque command signals require the full winding mode;
   providing switching control commands for a direct-axis current, a quadrature-axis current and current loop gains for full stator windings if the motor speed and torque command signals require the full winding mode and the winding mode is not transitioning from the half winding mode to the full winding mode;
   setting the direct-axis current and the quadrature-axis current to zero if the motor speed and torque command signals require the full winding mode and it is determined that the winding mode is transitioning from the half winding mode to the full winding mode;
   waiting for a phase current in stator windings to be less than a predetermined minimum current after the direct-axis current and the quadrature-axis current have been set to zero;
   disabling inverter circuit switch signals and half winding mode switch signals provided to switch devices for the half winding mode after the direct-axis current and the quadrature-axis current are set to zero;
   waiting for a predetermined time delay after the inverter circuit switch signals and the half winding mode switch signals are disabled;
   setting the direct-axis current, the quadrature-axis current and the current loop gains to predetermined values for the full winding mode after the time delay has expired;
   enabling the inverter circuit switch signals and the full winding mode switch signals provided to the switch devices for the full winding mode; and
   providing the switching control commands for the direct-axis current, the quadrature-axis current and the current loop gains for the full stator windings.

9. The method according to claim 8 further comprising identifying diagnostic trouble codes or faults that may affect machine performance and operation before determining whether the motor speed and torque command signals require the full winding mode or the half winding mode, and disabling switch signals provided to the inverter switches if a trouble code or fault is detected.

10. The method according to claim 8 wherein waiting for a predetermined time delay includes waiting for a time between 1 and 10 msec.

11. The method according to claim 8 wherein the electric machine is a three-phase permanent magnet (PM) AC machine.

12. The method according to claim 8 wherein the electric machine is on a vehicle.

13. A method for controlling switching between a full winding control mode and a half winding control mode for a symmetrical winding configuration of a multi-phase electric machine, said method comprising:
   identifying motor speed and torque command signals for the machine;
   determining whether the motor speed and torque command signals require the full winding mode or the half winding mode;
   determining whether the winding control mode is transitioning from the full winding mode to the half winding mode if the motor speed and torque command signals require the half winding mode;
   providing switching control commands for a direct-axis current, a quadrature-axis current and current loop gains for full stator windings if the motor speed and torque command signals require the half winding mode and the winding mode is not transitioning from the full winding mode to the half winding mode;
   setting the direct-axis current and the quadrature-axis current to zero if the motor speed and torque command signals require the half winding mode and it is determined that the winding mode is transitioning from the full winding mode to the half winding mode;
   waiting for a phase current in stator windings to be less than a predetermined minimum current after the direct-axis current and the quadrature-axis current have been set to zero;
   disabling inverter circuit switch signals and full winding mode switch signals provided to switch devices for the full winding mode after the direct-axis current and the quadrature-axis current are set to zero;
   waiting for a predetermined time delay after the inverter circuit switch signals and the full winding mode switch signals are disabled;
   setting the direct-axis current, the quadrature-axis current and the current loop gains to predetermined values for the half winding mode after the time delay has expired;
   enabling the inverter circuit switch signals and the half winding mode switch signals provided to the switch devices for the half winding mode; and
   providing the switching control commands for the plurality of switch assemblies for the direct-axis current, the quadrature-axis current and the current loop gains for the half stator windings.

14. The method according to claim 13 further comprising identifying diagnostic trouble codes or faults that may affect machine performance and operation before determining whether the motor speed and torque command signals require the full winding mode or the half winding mode, and disabling switch signals provided to the inverter switches if a trouble code or fault is detected.

15. The method according to claim 13 wherein waiting for a predetermined time delay includes waiting for a time between 1 and 10 msec.

16. The method according to claim 13 wherein the electric machine is a three-phase permanent magnet (PM) AC machine.

17. The method according to claim 13 wherein the electric machine is on a vehicle.

* * * * *